United States Patent
Khawer et al.

(10) Patent No.: US 9,935,743 B2
(45) Date of Patent: Apr. 3, 2018

(54) NETWORK ELEMENT AND METHOD OF OPERATING THE SAME

(71) Applicants: Mohammad R. Khawer, Lake Hopatcong, NJ (US); Robert Soni, Randolph, NJ (US)

(72) Inventors: Mohammad R. Khawer, Lake Hopatcong, NJ (US); Robert Soni, Randolph, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 255 days.

(21) Appl. No.: 14/480,950

(22) Filed: Sep. 9, 2014

(65) Prior Publication Data

US 2016/0073405 A1 Mar. 10, 2016

(51) Int. Cl.
*H04L 5/00* (2006.01)
*H04W 84/12* (2009.01)
*H04W 88/10* (2009.01)

(52) U.S. Cl.
CPC ........... *H04L 5/0007* (2013.01); *H04W 84/12* (2013.01); *H04W 88/10* (2013.01)

(58) Field of Classification Search
CPC ...... H04L 5/0007; H04W 84/12; H04W 88/10
See application file for complete search history.

(56) References Cited

U.S. PATENT DOCUMENTS

| 2012/0082040 | A1* | 4/2012 | Gong | H04W 74/0816 370/252 |
| 2014/0248917 | A1* | 9/2014 | Scipione | H04W 72/0406 455/509 |
| 2014/0269464 | A1* | 9/2014 | Park | H04W 48/16 370/311 |

(Continued)

OTHER PUBLICATIONS

Revision of Part 15 of the Commission's Rules to Permit Unlicensed National Information Infrastructure (U-NII) Devices in the 5 GHz Band, Federal Communications Commission, FCC 13-22, Feb. 20, 2013, pp. 1769-1826.

(Continued)

*Primary Examiner* — Omar Ghowrwal
(74) *Attorney, Agent, or Firm* — Harness, Dickey & Pierce, P.L.C.

(57) ABSTRACT

A method of operating a first network element in a wireless communications network to perform WIFI and long term evolution (LTE) communications with a second network element on an unlicensed portion of a radio spectrum, the unlicensed portion being divided into first and second frequency regions, includes performing, at the first network element, WIFI protocol communications over the unlicensed portion, including at least one of transmission to, and reception from, a second network element, of WIFI protocol data using one or more first frequencies of the first frequency region, and performing, at the first network element, LTE protocol communications over the unlicensed portion including at least one of transmission to, and reception from, (Continued)

the second network element, of LTE protocol data using one or more second frequencies of the second frequency region, the WIFI protocol communications and LTE protocol communications being performed by the first network element simultaneously.

10 Claims, 5 Drawing Sheets

(56) References Cited

U.S. PATENT DOCUMENTS

| | | | | |
|---|---|---|---|---|
| 2015/0063150 | A1* | 3/2015 | Sadek | H04W 24/10 370/252 |
| 2015/0133184 | A1* | 5/2015 | Sadek | H04W 16/14 455/552.1 |
| 2015/0223243 | A1* | 8/2015 | Tabet | H04W 28/085 370/330 |
| 2015/0326360 | A1* | 11/2015 | Malladi | H04L 5/0032 370/329 |
| 2015/0382362 | A1* | 12/2015 | Park | H04W 72/082 370/330 |
| 2016/0037503 | A1* | 2/2016 | Wu | H04W 72/0406 370/329 |

OTHER PUBLICATIONS

IEEE Standard 802.11ac-2013; "IEEE Standard for Information Technology, Telecommunications and Information Exchange Between Systems, Local and Metropolitan Area Networks, Specific Requirements;" Part 11: Wireless LAN Medium Access Control (MAC) and Physical Layer (PHY) Specifications; Amendment 4: Enhancements for Very High Throughput for Operation in Bands Below 6 GHz; *IEEE Computer Society*, 2013.

3GPP TS 36.300 v12.2.0; "34d Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 12)"; Jun. 2014.

* cited by examiner

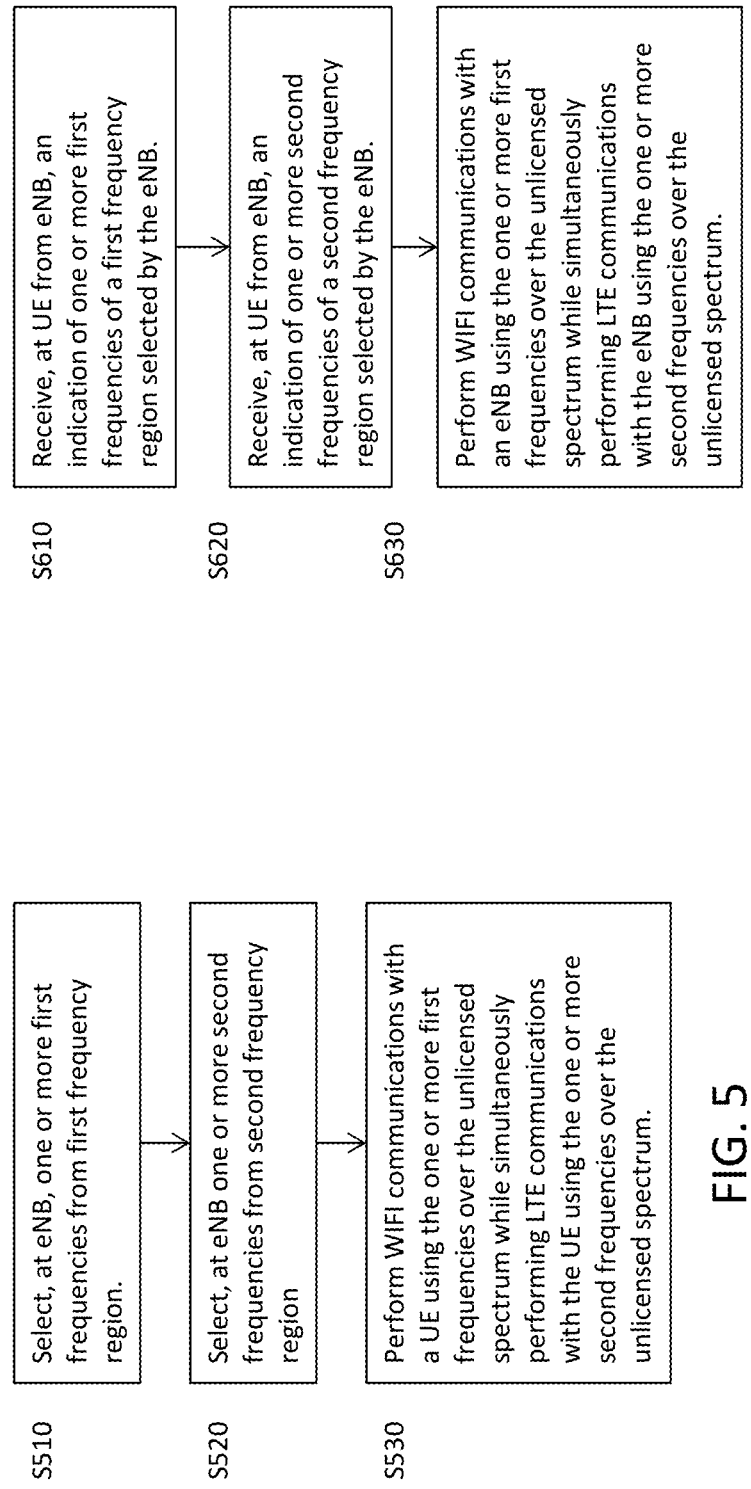

NETWORK ELEMENT AND METHOD OF OPERATING THE SAME

BACKGROUND

1. Field

Example embodiments relate generally to providing wireless coverage in a cell, and particularly to providing WIFI and long term evolution (LTE) coverage within the same cell.

2. Related Art

Heterogeneous wireless communications networks (HetNets) are deployments of cells with differing coverage radii within a single geographic area. A typical configuration is one where macro (e.g., large) cells provide continuous wireless coverage over the area while pico or femto (e.g., small) cells provide wireless coverage for local hot spots or coverage holes. Large and small cells communicate with mobile devices using radio frequency (RF) communications.

RF communication may be regulated by a government entity such that the government entity controls which parties may use which frequency bands for communication. For example, in the US, the government has defined certain portions of the radio spectrum as being part of a licensed band while defining other portions of the radio spectrum as being part of an unlicensed band. Licensed bands are bands including radio frequencies which require an entity to obtain a license from the government before using the radio frequencies for communication. To the contrary, an entity may not require a special license to use radio frequencies within an unlicensed band for communications. In the US, an example of an unlicensed band is the known 5 GHz unlicensed band. In general, example uses of the licensed portions of the radio spectrum include use by wireless communications companies to provide wireless coverage for mobile devices, while example uses of the unlicensed portions of the radio spectrum include use by 802.11 (e.g., WIFI) capable devices.

SUMMARY

According to at least one or more example embodiments, a method of operating a first network element in a wireless communications network to perform WIFI and LTE communications with a second network element on an unlicensed portion of a radio spectrum, the unlicensed portion being divided into first and second frequency regions, includes performing, at the first network element, data communications with a second network element using the unlicensed portion of the radio spectrum, the performing the data communications including, performing, at the first network element, WIFI protocol communications over the unlicensed portion of the radio spectrum, the WIFI protocol communications including at least one of transmission to the second network element, and reception from the second network element, of WIFI protocol data, the WIFI protocol communications being performed using one or more first frequencies from among the first frequency region, and performing, at the first network element, long term evolution (LTE) protocol communications over the unlicensed portion of the radio spectrum, the LTE protocol communications including at least one of transmission to the second network element, and reception from the second network element, of LTE protocol data, the LTE protocol communications being performed using one or more second frequencies from among the second frequency region, the WIFI protocol communications and LTE protocol communications being performed by the first network element simultaneously.

The first network element may include an evolved node B (eNB) and a WIFI access point (AP), and the second network element may be a user equipment (UE).

The first network element may be a user equipment (UE), and the second network element may include an evolved node B (eNB) and a WIFI access point (AP).

The unlicensed portion of the radio spectrum may be divided into the first and second frequency regions by a frequency dividing value, the frequency dividing value being one of a frequency and a frequency range.

The unlicensed portion of the radio spectrum may be an unlicensed national information infrastructure (UNII) section of a 5 GHz unlicensed band.

The frequency dividing value may be a frequency range that includes a UNII-2 band.

According to one or more example embodiments, a method of operating a first network element in a wireless communications network to perform WIFI and LTE communications with a second network element on an unlicensed portion of a radio spectrum, includes applying, at the first network element, a first channelization scheme by which the unlicensed portion is divided into a plurality of channels; performing LTE protocol communications at the first network element, the LTE communications including sending to, or receiving from, the second network element, LTE protocol data, the LTE protocol communications being performed using one or more channels from among the plurality of channels in accordance with the first channelization scheme; and performing WIFI protocol communications at the first network element, the WIFI communications including sending to, or receiving from, the second network element, WIFI protocol data, the WIFI protocol communications being performed using one or more channels from among the plurality of channels in accordance with the first channelization scheme.

The first network element may include an evolved node B (eNB) and a WIFI access point (AP), and the second network element is a user equipment (UE).

The first network element may be a user equipment (UE), and the second network element includes may be an evolved node B (eNB) and a WIFI access point (AP).

According to one or more example embodiments, a first network element for performing LTE and WIFI communications in a wireless communications network with a second network element on an unlicensed portion of a radio spectrum, the unlicensed portion being divided into first and second frequency regions, includes a processing unit including one or more processors, the processing unit being configured to control operations including performing, at the first network element, data communications with a second network element using the unlicensed portion of the radio spectrum, the performing the data communications including, performing, at the first network element, WIFI protocol communications over the unlicensed portion of the radio spectrum, the WIFI protocol communications including at least one of transmission to the second network element, or reception from the second network element, of WIFI protocol data, the WIFI protocol communications being performed using one or more first frequencies from among the first frequency region, and performing, at the first network element, long term evolution (LTE) protocol communications over the unlicensed portion of the radio spectrum, the LTE protocol communications including at least one of transmission to the second network element, or reception from the second network element, of LTE protocol data, the LTE protocol communications being performed using one or more second frequencies from among the second frequency region, the WIFI protocol communications and LTE protocol communications being performed by the first network element simultaneously.

The first network element may includes an evolved node B (eNB) and a WIFI access point (AP), and the second network element may be a user equipment (UE).

The first network element may be a user equipment (UE), and the second network element may include an evolved node B (eNB) and a WIFI access point (AP).

The processing unit may be configured such that the unlicensed portion of the radio spectrum is divided, by the processing unit, into the first and second frequency regions in accordance with a frequency dividing value, the frequency dividing value being one of a frequency and a frequency range.

The processing unit may be configured such that the unlicensed portion of the radio spectrum is a unlicensed national information infrastructure (UNII) section of a 5 GHz unlicensed band.

The processing unit may be configured such that the frequency dividing value is a frequency range that includes infrastructure UNII-2 band.

According to one or more example embodiments, a first network element for performing LTE and WIFI communications in a wireless communications network with a second network element on an unlicensed portion of a radio spectrum, the unlicensed portion being divided into first and second frequency regions, includes a processing unit including one or more processors, the processing unit being configured to control operations including, applying, at the first network element, a first channelization scheme by which the unlicensed portion is divided into a plurality of channels, performing LTE protocol communications at the first network element, the LTE communications including sending to, or receiving from, the second network element, LTE protocol data, the LTE protocol communications being performed using one or more channels from among the plurality of channels in accordance with the first channelization scheme, and performing WIFI protocol communications at the first network element, the WIFI communications including sending to, or receiving from, the second network element, WIFI protocol data, the WIFI protocol communications being performed using one or more channels from among the plurality of channels in accordance with the first channelization scheme.

The first network element may include an evolved node B (eNB) and a WIFI access point (AP), and the second network element may be a user equipment (UE).

The first network element may be a user equipment (UE), and the second network element may include an evolved node B (eNB) and a WIFI access point (AP).

BRIEF DESCRIPTION OF THE DRAWINGS

At least some example embodiments will become more fully understood from the detailed description provided below and the accompanying drawings, wherein like elements are represented by like reference numerals, which are given by way of illustration only and thus are not limiting of example embodiments and wherein:

FIG. 5 is a flow chart illustrating an example method of operating an eNB in a wireless communications network to perform LTE and WIFI communications on an unlicensed portion of a radio spectrum, where the unlicensed portion has been divided into first and second frequency regions according to one or more example embodiments.

FIG. 6 is a flow chart illustrating an example method of operating a UE in a wireless communications network to perform LTE and WIFI communications on an unlicensed portion of a radio spectrum, where the unlicensed portion has been divided into first and second frequency regions according to one or more example embodiments.

DETAILED DESCRIPTION OF EXAMPLE EMBODIMENTS

Figure 1:
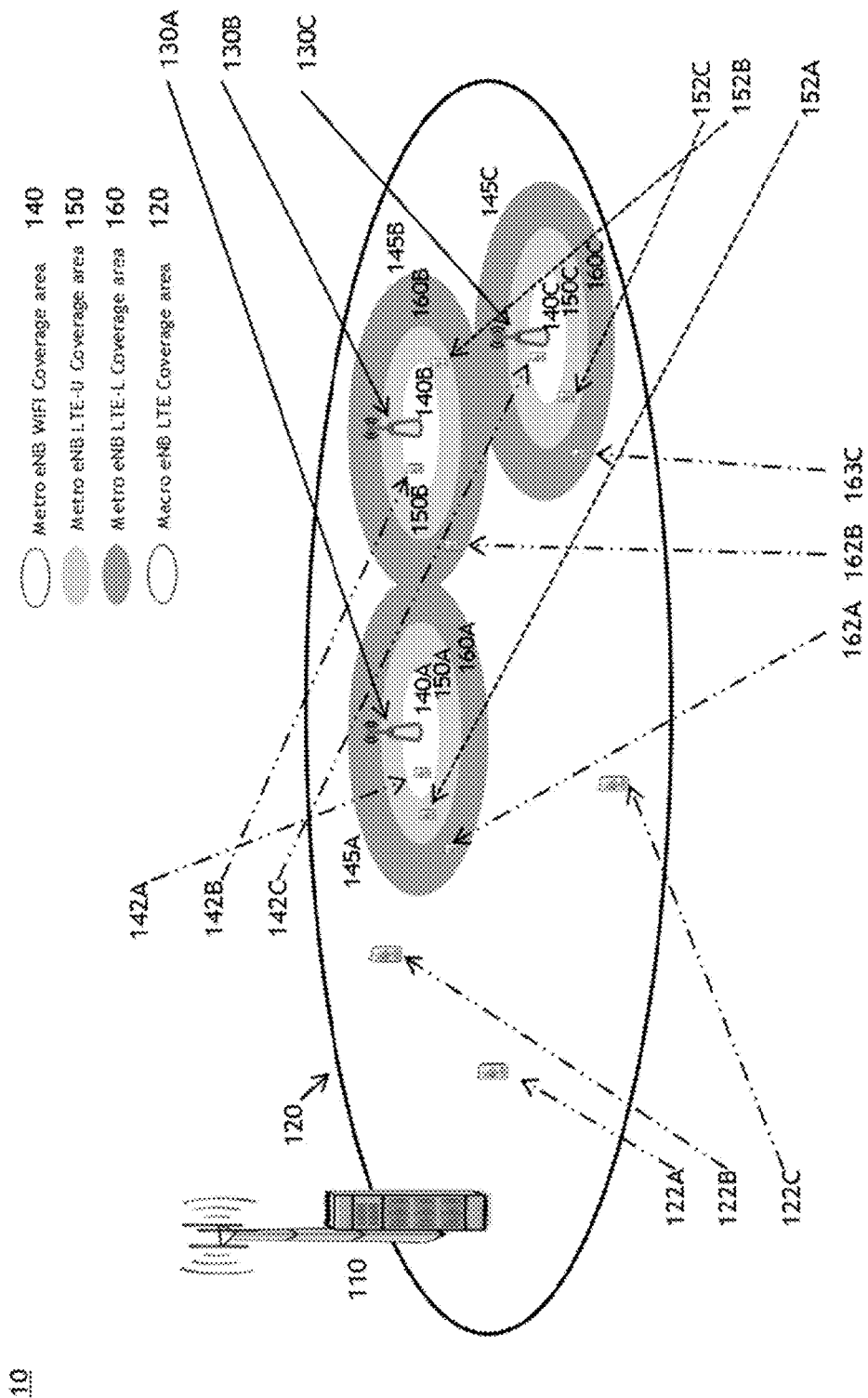
FIG. 1 is a diagram illustrating a portion of a wireless communications network according to example embodiments.

Various example embodiments will now be described more fully with reference to the accompanying drawings in which some example embodiments are shown.

Detailed illustrative embodiments are disclosed herein. However, specific structural and functional details disclosed herein are merely representative for purposes of describing at least some example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of example embodiments. Like numbers refer to like elements throughout the description of the figures. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

As used herein, the term user equipment (UE) may be considered synonymous to, and may hereafter be occasionally referred to, as a terminal, mobile unit, mobile device, mobile station, mobile user, access terminal (AT), subscriber, user, remote station, access terminal, receiver, etc., and may describe a remote user of wireless resources in a wireless communication network. The term evolved Node B (eNB) may be considered synonymous to and/or referred to as a base transceiver station (BTS), NodeB, base station (BS), Home eNB (HeNB), access point (AP), etc. and may describe equipment that provides the radio baseband functions for data and/or voice connectivity between a network and one or more users.

Exemplary embodiments are discussed herein as being implemented in a suitable computing environment. Although not required, exemplary embodiments will be described in the general context of computer-executable instructions, such as program modules or functional processes, being executed by one or more computer processors or CPUs. Generally, program modules or functional processes include routines, programs, objects, components, data structures, etc. that performs particular tasks or implement particular abstract data types.

The program modules and functional processes discussed herein may be implemented using existing hardware in existing communication networks. For example, program modules and functional processes discussed herein may be implemented using existing hardware at existing network elements or control nodes (e.g., an eNB shown in FIG. 1). Such existing hardware may include one or more digital signal processors (DSPs), application-specific-integrated-circuits (ASICs), field programmable gate arrays (FPGAs) computers or the like.

In the following description, illustrative embodiments will be described with reference to acts and symbolic representations of operations (e.g., in the form of flowcharts) that are performed by one or more processors, unless indicated otherwise. As such, it will be understood that such acts and operations, which are at times referred to as being computer-executed, include the manipulation by the processor of electrical signals representing data in a structured form. This manipulation transforms the data or maintains it at locations in the memory system of the computer, which reconfigures or otherwise alters the operation of the computer in a manner well understood by those skilled in the art.

The demand for mobile wireless data is growing at an exponential rate in recent years. Further, demand for mobile wireless data may continue to increase at a great rate in the coming years. To meet such a massive demand in mobile wireless data rate growth a several fold increase in spectrum is desirable. Accordingly, it may be very desirable to make use of the unlicensed band to aid the existing licensed band in meeting the large mobile wireless data growth demand discussed above.

Presently the 5 GHZ unlicensed band is used by WIFI devices that have a very high penetration rate in smart phones, and tablet PCs. The Institute of Electrical and Electronics Engineers (IEEE) 802.11 wireless protocol (i.e., WIFI) is suitable, for example, for interference free environment. However, the IEEE 802.11 wireless protocol may offer unpredictable quality of service (QOS) which may be considered far inferior to the QOS offered by licensed cellular wireless interfaces such as LTE, because LTE may outperform WIFI in an interference limiting environment by offering higher spectral efficiency. Further, WIFI media access control (MAC) is contention based between the uplink (UL), and downlink (DL) transmission, and the coverage is uplink (UL) limited as the device UL Transmit (Tx) power is typically less than the WIFI Access Point (AP) DL Tx power.

Accordingly, it is desirable to provide wireless communications over the 5 GHz unlicensed band using the LTE protocol (referred to herein as LTE-U). However, due to the substantially large presence of WIFI devices already communicating on the 5 GHz unlicensed band, LTE-U will have to co-exist and share the 5 GHZ unlicensed band with the incumbent WIFI in a fair manner. Further, in order to improve or optimize data capacity within a small cell that uses LTE over licensed frequencies (referred to herein as LTE-L), LTE-U and WIFI, it is desirable for a device attached to that small cell to be able to use all three types of interfaces (LTE-L, LTE-U and WIFI) simultaneously Apparatuses and methods for providing coexistence of LTE and WIFI communications in the same cell will now be discussed in greater detail below.

Overview of Network Architecture

FIG. 1 illustrates a portion of a wireless communications network 100. Referring to FIG. 1, according to one or more example embodiments, the wireless communications network 100 may support both communications according to both long-term evolution (LTE) and 802.11 (e.g., WIFI) protocols. As used herein, the terms '802.11' and 'WIFI' both refer to the IEEE 802.11 protocol.

Communications network 100 includes a macro cell evolved Node B (eNB) 110 and first through third small cell eNBs 140A-140C. The macro cell eNB 110 is capable of providing UEs within macro cell 120 with wireless access to a core network in accordance with the LTE protocol. The first through third small cell eNBs 140A-140C are capable of providing wireless access to UEs within first-through third small cells 145A-145C, respectively, with wireless access to the core network in accordance with LTE and 802.11 protocols. Communications network 100 may be a heterogeneous network (HetNet) in which small cells 145A-145C are underlaid with respect to the macro cell 120.

According to one or more example embodiments, each of small cells 145A-145C include both an eNB and, for providing WIFI access, a WIFI access point (AP) co-located with the eNB. For ease of description, the WIFI APs are described herein with reference to an example where the co-located WIFI APs are included in the small cell eNBs 130A-130B. However, according to one or more example embodiments, the WIFI APs in small cells 145A-145C may also be separate devices that are located within the same structure, housing and/or location as the eNBs 130A-130B. For example, each of small cells 145A-145C may include a network element that includes both an eNB and a corresponding WIFI AP. Thus, according to one or more example embodiments, WIFI functions (e.g., WIFI transmission or reception functions) described herein as being performed by small cell eNBs 130A-130B or small cells 145A-145C may be performed by a WIFI APs included in small cell eNBs 130A-130B or WIFI APs co-located with, by not included in, small cell eNBs 130A-130B, as is described above.

According to one or more example embodiments, the first through third small cell eNBs 140A-140C may respectively include WIFI access points (AP)s. Accordingly, the first through third small cell eNBs 140A-140C are capable of providing wireless access to UEs in accordance with the 802.11 protocol using the 5 GHz unlicensed band as is illustrated by first through third WIFI coverage regions 140A, 140B and 140C, respectively. Further, the first through third small cell eNBs 140A-140C are capable of providing wireless access to UEs in accordance with the LTE protocol using the 5 GHz unlicensed band as is illustrated by first through third LTE-U coverage regions 150A, 150B, and 150C, respectively. Additionally, the first through third small cell eNBs 140A-140C are capable of providing wireless access to UEs in accordance with the LTE protocol using frequencies from licensed bands, as is illustrated by first through third LTE-L coverage regions 160A, 160B, and 160C, respectively.

According one or more example embodiments, the terms 'licensed' and 'unlicensed' as used herein with reference to radio spectrum, frequencies, or bands may refer, respectively, to licensed and unlicensed portions of the radio spectrum as defined by a national, regional and/or government organization including, for example, the US Federal Communications Commission (FCC), which defines the known 5 GHz unlicensed band as an unlicensed portion of the radio spectrum. Further, licensed portions of the radio spectrum are portions of the radio spectrum for which an entity (e.g., service provider or communications network operator) must obtain a license from a national, regional and/or government organization in order for the entity to use the portions of the radio spectrum; and unlicensed portions of the radio spectrum are portions of the radio spectrum that do not require an entity to obtain a license from a national, regional and/or government organization in order for the entity to use the portions of the radio spectrum. However, is some cases, devices may need to be certified to use portions of the unlicensed spectrum including, for example, dynamic frequency selection (DFS) certification which will be discussed in greater detail below with referent to FIG. 4. As used herein with reference to the organization of the radio spectrum used by the FCC, the term 'unlicensed' includes portions of the 5 GHz unlicensed band for which DFS certification is required and the term 'licensed' does not refer to portions of the 5 GHz unlicensed band for which DFS certification is required.

The first through third small cells 145A-C may be, for example, metro cells, pico cells or a femto cells. Further, the term 'small cell' as used herein may be considered synonymous to and/or referred to as a metro cell, pico cell or femto cell.

The unlicensed spectrum has lower Tx power requirements compared to the licensed spectrum. Due to these lower Tx power requirements, LTE-U is generally more suitable for small cell deployment than for Macro cell deployment that has a wider coverage area. A 5 W outdoor small cell will therefore have a much larger LTE-L coverage area compared to the coverage area of a 1 W LTE-U. As is illustrated in FIG. 1, the LTE-L coverage areas (160A-C) may be larger in terms of area than the LTE-U coverage areas (150A-C), and the LTE-U coverage areas (150A-C) may be larger in terms of area than the WIFI coverage areas (140A-C). According to one or more example embodiments, the LTE-L coverage areas (160A-C) may include the LTE-U coverage areas (150A-C), and the LTE-U coverage areas (150A-C) may include the WIFI coverage areas (140A-C). Additional reasons for the differing coverage areas will now be discussed below.

WIFI coverage areas 140A-C may be limited by a WIFI UL range as the device UL Tx power is typically less than that of the WIFI AP, and thus, may be smaller than LTE-U coverage areas 150A-C. According to one or more example embodiments, the LTE-U supplemental downlink (SDL) channel mode of operation may be executed such that only the best effort DL data is transmitted to the UE, and all control, and UL data from the UE is transmitted back to the eNodeB via the licensed LTE-L carrier. For example, WIFI may be used for both UL and DL communications between an eNB and UE in WIFI coverage areas 104A-C. Further, a UL range for a UE using WIFI over unlicensed frequencies may be lower than a UL range for a UE using LTE over licensed frequencies.

LTE-U coverage areas 150A-C may be limited by a DL range over unlicensed frequencies, and thus, may be smaller than LTE-L coverage areas 160A-C. For example, as is discussed above, according to at least one example embodiment, one or more of the LTE-U coverage areas 150A-150C may employ a supplemental DL (SDL) scheme in which some DL communications between an eNB and UE are performed using LTE over unlicensed frequencies, and UL communications between a eNB and UE are performed using LTE over licensed frequencies. For example, in the SDL scheme, a licensed LTE carrier may serve as the anchor carrier and carry all the control, and critical UL/DL data. An unlicensed LTE carrier may serve as a secondary carrier that carries best effort user data in DL only. Further, a DL range for a UE using LTE over unlicensed frequencies may be lower than a DL range for a UE using LTE over licensed frequencies.

LTE-L coverage areas 160A-C may have the largest coverage areas because both UL and DL communications between an eNB and UE are performed using LTE over licensed frequencies.

According to one or more example embodiments, first through third WIFI UEs 142A-C may be UEs that are located within first through third WIFI coverage areas 140A-C, respectively, and are thus capable of using any or all of the WIFI protocol for wireless communications in the 5 GHz unlicensed band, the LTE protocol for wireless communications in the 5 GHz unlicensed band and, the LTE protocol for wireless communications in a licensed band. Further, according to one or more example embodiments, first through third LTE-U UEs 152A-C may be UEs that are located within first through third LTE-U coverage areas 150A-C, respectively, and are thus capable of using LTE protocol for wireless communications in either or both of the 5 GHz unlicensed band and a licensed band. Further, according to one or more example embodiments, first through third LTE-L UEs 162A-C may be UEs that are located within first through third LTE coverage areas 160A-C, respectively, and are capable of using the LTE protocol for wireless communications in the licensed band.

Though, for the purpose of simplicity, communications network 100 is illustrated as having only macro cell eNB 110 and three small cell eNBs 140A-C, communications network 100 may have any number of macro cell eNBs and small cell eNBs, and any number of UEs communicating with one or both of the macro cell eNBs and small cell eNBs. Further, macro cell eNB 110 and first through third small cell eNBs 140A-C may be connected to other core network elements included in the communications network 100 including, for example, one or more mobility management entities (MME) a Home eNB gateway, a security gateway and/or one or more operations, administration and management (OAM) nodes (not shown).

Data, control signals and other information described herein as being sent and/or received by the macro cell 120 may be sent and/or received by the macro cell eNB 110. Further, operations described herein as being performed by the macro cell 120 may be performed by the macro cell eNB 110. Data, control signals and other information described herein as being sent and/or received by the first through third small cells 145A-C may be sent and/or received by the first through third small cell eNBs 140A-C, respectively. Further, operations described herein as being performed by the first through third small cells 145A-C may be performed by the first through third small cell eNBs 140A-C, respectively.

Example eNB and UE Structures

Figures 2A, 2B:
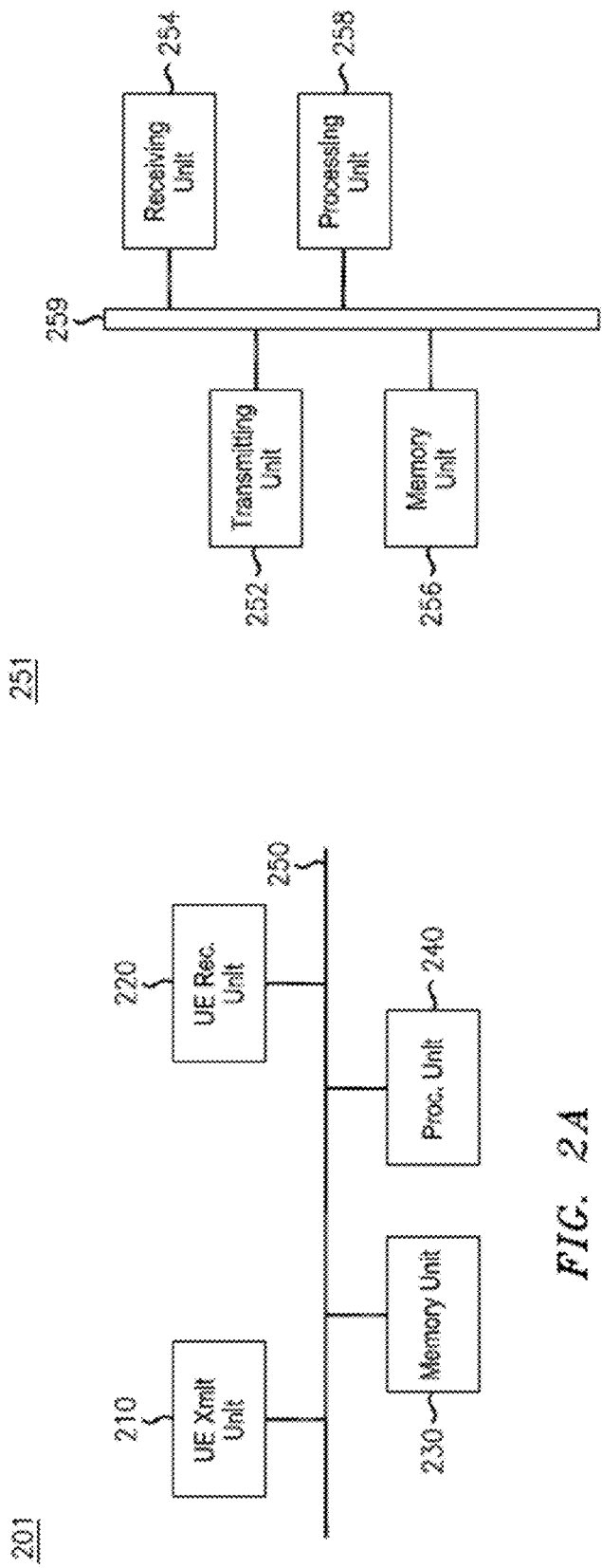
FIG. 2A is a diagram illustrating an example structure of a user equipment (UE) according to one or more example embodiments.
FIG. 2B is a diagram illustrating an example structure of a network element according to one or more example embodiments.

FIG. 2A is a diagram illustrating an example structure of a UE 201. According to example embodiments, any or all UEs in the communications network 100 may have the same structure and operation as UE 201 described below.

The UE 201 may include, for example, a UE transmitting unit 210, a UE receiving unit 220, a memory unit 230, a processing unit 240, and a data bus 250.

The UE transmitting unit 210, UE receiving unit 220, memory unit 230, and processing unit 240 may send data to and/or receive data from one another using the data bus 250. The UE transmitting unit 210 is a device that includes hardware and any necessary software for transmitting wireless signals on an uplink (reverse link) channel including, for example, data signals or control signals, via one or more wireless connections to other wireless devices (e.g., eNBs). For example, the UE transmission unit 210 may include one or more transmissions filters. The one or more transmissions filters included in the UE transmission unit 210 may be, for example, band pass filters. The one or more transmissions filters included in the UE transmission unit 210 may include, for example, one or more filters for transmitting WIFI protocol data over bands including, for example, the 5 GHz unlicensed band, and a one or more filters for transmitting LTE protocol data over one or more licensed bands. The UE transmission unit 210 may also include one or more filters for transmitting LTE protocol data over the 5 GHz unlicensed band. Further, according to one or more example embodiments, the UE 201 may have no filter for transmitting LTE protocol data over the 5 GHz unlicensed band.

The UE receiving unit 220 is a device that includes hardware and any necessary software for receiving wireless signals on a downlink (forward link) channel including, for example, data signals or control signals, via one or more wireless connections to other wireless devices (e.g., eNBs). For example, the UE receiving unit 220 may include one or more reception filters. The one or more transmissions filters included in the UE receiving unit 220 may include, for example, one or more filters for receiving WIFI protocol data over bands including, for example, the 5 GHz unlicensed band, and a one or more filters for receiving LTE protocol data over one or more licensed bands. The UE transmission unit 220 may also include one or more filters for receiving LTE protocol data over the 5 GHz unlicensed band.

The memory unit 230 may be any storage medium capable of storing data including magnetic storage, flash storage, etc.

The processing unit 240 may be any device capable of processing data including, for example, a processor. The term 'processor', as used herein, refers to, for example, a hardware-implemented data processing device having circuitry that is physically structured to execute desired operations including, for example, operations represented as code and/or instructions included in a program. Examples of the above-referenced hardware-implemented data processing device include, but are not limited to, a microprocessor, a central processing unit (CPU), a processor core, a multiprocessor, an application-specific integrated circuit (ASIC), and a field programmable gate array (FPGA).

According to at least one example embodiment, any operations described herein, for example with reference to any of FIGS. 1-5, as being performed by a UE may be performed by an electronic device having the structure of the UE 201 illustrated in FIG. 2A. For example, according to at least one example embodiment, the UE 201 may be programmed, in terms of software and/or hardware, to perform any or all of the functions described herein as being performed by a UE. Consequently, each of the UEs described herein may be embodied as special purpose computers.

Examples of the UE 201 being programmed, in terms of software, to perform any or all of the functions described herein as being performed by any of the UEs described herein will now be discussed below. For example, the memory unit 230 may store a program including executable instructions corresponding to any or all of the operations described herein with reference to FIGS. 1-5 as being performed by a UE. According to at least one example embodiment, additionally or alternatively to being stored in the memory unit 230, the executable instructions may be stored in a computer-readable medium including, for example, an optical disc, flash drive, SD card, etc., and the UE 201 may include hardware for reading data stored on the computer readable-medium. Further, the processing unit 240 may be a processor configured to perform any or all of the operations described herein with reference to FIGS. 1-5 as being performed by a UE, for example, by reading and executing the executable instructions stored in at least one of the memory unit 230 and a computer readable storage medium loaded into hardware included in the UE 201 for reading computer-readable mediums.

Examples of the UE 201 being programmed, in terms of hardware, to perform any or all of the functions described herein as being performed by a UE will now be discussed below. Additionally or alternatively to executable instructions corresponding to the functions described with reference to FIGS. 1-5 as being performed by a network element being stored in a memory unit or a computer-readable medium as is discussed above, the processing unit 240 may include a circuit that has a structural design dedicated to performing any or all of the operations described herein with reference to FIGS. 1-5 as being performed by a UE. For example, the above-referenced circuit included in the processing unit 240 may be a FPGA or ASIC physically programmed to perform any or all of the operations described with reference to FIGS. 1-5 as being performed by a UE.

FIG. 2B is a diagram illustrating an example structure of a network element 251. According to example embodiments, any or all eNBs in the communications network 100, including for example the macro cell BS 110 and the first through third small cell BSs 130A-C, may have the same structure and operation described below with respect to network element 251. Additionally, with respect to one or more example embodiments in which all WIFI APs in the communications network 100 are co-located with, but not included in, a corresponding eNB, the WIFI APs may also have the same structure and operation described below with respect to network element 251.

Referring to FIG. 2B, the network element 251 may include, for example, a data bus 259, a transmitting unit 252, a receiving unit 254, a memory unit 256, and a processing unit 258.

The transmitting unit 252, receiving unit 254, memory unit 256, and processing unit 258 may send data to and/or receive data from one another using the data bus 259.

The transmitting unit 252 is a device that includes hardware and any necessary software for transmitting signals including, for example, control signals or data signals via one or more wired and/or wireless connections to other network elements in communications network 105. For example, the transmitting unit 252 may include one or more transmission filters. The one or more transmission filters included in the transmission unit 252 may be, for example, band pass filters.

The one or more transmission filters included in the transmitting unit 252 may include, for example, any or all of one or more filters for transmitting WIFI protocol data over band including the 5 GHz unlicensed band, one or more filters for transmitting LTE protocol data over the 5 GHz unlicensed band, and one or more filters for transmitting LTE protocol data over one or more licensed bands.

The receiving unit 254 is a device that includes hardware and any necessary software for receiving wireless signals including, for example, control signals or data signals via one or more wired and/or wireless connections to other network elements in the communications network 105. For example, the receiving unit 254 may include one or more reception filters. The one or more reception filters included in the receiving unit 254 may be, for example, band pass filters.

The one or more reception filters included in the receiving unit 254 may include, for example, any or all of one or more filters for receiving WIFI protocol data over the 5 GHz unlicensed band, one or more filters for receiving LTE protocol data over the 5 GHz unlicensed band, and one or more filters for transmitting LTE protocol data over one or more licensed bands.

The memory unit 256 may be any device capable of storing data including magnetic storage, flash storage, etc.

The processing unit 258 may be any device capable of processing data including, for example, a processor.

According to at least one example embodiment, any operations described herein, for example with reference to any of FIGS. 1-5, as being performed by an eNB of WIFI AP may be performed by an electronic device having the structure of the network element 251 illustrated in FIG. 2B. For example, according to at least one example embodiment, the network element 251 may be programmed, in terms of software and/or hardware, to perform any or all of the functions described herein as being performed by an eNB of WIFI AP. Consequently, each of the eNBs and WIFI APs described herein may be embodied as special purpose computers.

Examples of the network element 251 being programmed, in terms of software, to perform any or all of the functions described herein as being performed by any of the eNBs or WIFI APs described herein will now be discussed below. For example, the memory unit 256 may store a program including executable instructions corresponding to any or all of the operations described herein with reference to FIGS. 1-5 as being performed by an eNB or WIFI AP. According to at least one example embodiment, additionally or alternatively to being stored in the memory unit 256, the executable instructions may be stored in a computer-readable medium including, for example, an optical disc, flash drive, SD card, etc., and the network element 251 may include hardware for reading data stored on the computer readable-medium. Further, the processing unit 258 may be a processor configured to perform any or all of the operations described herein with reference to FIGS. 1-5 as being performed by an eNB or WIFI AP, for example, by reading and executing the executable instructions stored in at least one of the memory unit 256 and a computer readable storage medium loaded into hardware included in the network element 251 for reading computer-readable mediums.

Examples of the network element 251 being programmed, in terms of hardware, to perform any or all of the functions described herein as being performed by an eNB or WIFI AP will now be discussed below. Additionally or alternatively to executable instructions corresponding to the functions described with reference to FIGS. 1-5 as being performed by a network element being stored in a memory unit or a computer-readable medium as is discussed above, the processing unit 258 may include a circuit that has a structural design dedicated to performing any or all of the operations described herein with reference to FIGS. 1-5 as being performed by an eNB or WIFI AP. For example, the above-referenced circuit included in the processing unit 258 may be a FPGA or ASIC physically programmed to perform any or all of the operations described with reference to FIGS. 1-5 as being performed by an eNB or WIFI AP.

Overview of the Unlicensed Band

Figure 3B:
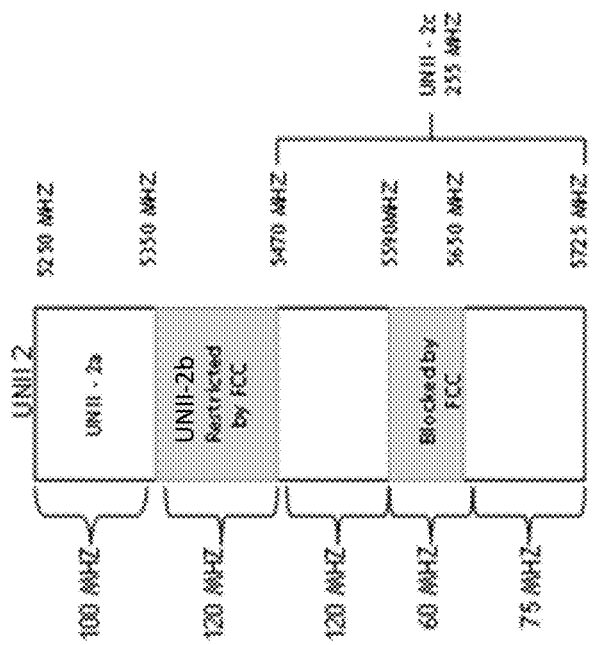
FIG. 3B is a diagram illustrating a layout of the UNII-2 portion of the 5 GHz unlicensed band.
Figure 3A:
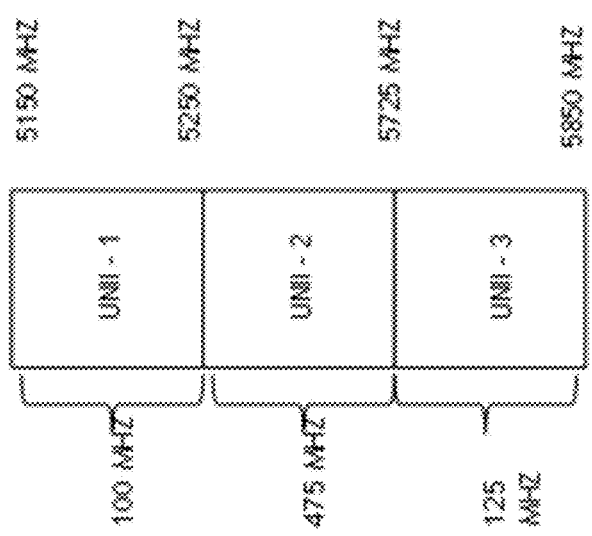
FIG. 3A is a diagram illustrating a layout of a unlicensed national information infrastructure (UNII) section of the 5 GHz unlicensed band.

FIG. 3A is a diagram illustrating a layout of a UNII section of the 5 GHz unlicensed band. Referring to FIG. 3A, in the US, the UNII section of the 5 GHz unlicensed band contains smaller unlicensed national information infrastructure (UNII) bands including, for example, the 100 MHz-wide UNII-1 band from 5.15-5.25 GHz, the 475 MHz-wide UNII-2 band from 5.25 GHz-5.725 GHz, and the 125 MHz-wide UNIII-3 from 5.725 GHz-5.850 GHz. Accordingly, as used herein, the UNII section of the 5 GHz unlicensed band refers to the UNII bands of the 5 GHz unlicensed band. The UNII bands of the 5 GHz unlicensed band include, for example, a 700 MHz wide band from 5.15-5.85 GHz, which includes UNII bands 1, 2 and 3. However, in the US, the 5 GHz unlicensed band also includes portions other than the UNII section.

FIG. 3B is a diagram illustrating a layout of the UNII-2 band within the 5 GHz unlicensed band. Referring to FIG. 3B, the UNII-2 band includes the 100 MHz-wide UNII-2A band from 5.25 GHz-5.35 GHz, a 120 MHz-wide UNII-2B band from 5.35 GHz to 5.47 GHz that is presently restricted by the FCC, and the UNII-2C band from 5.47 GHz to 5.725 GHz. As is illustrated in FIG. 3B, a portion of the UNII-2C band, from 5.59 GHz to 5.65 GHz, is presently blocked by the FCC.

Figure 4:
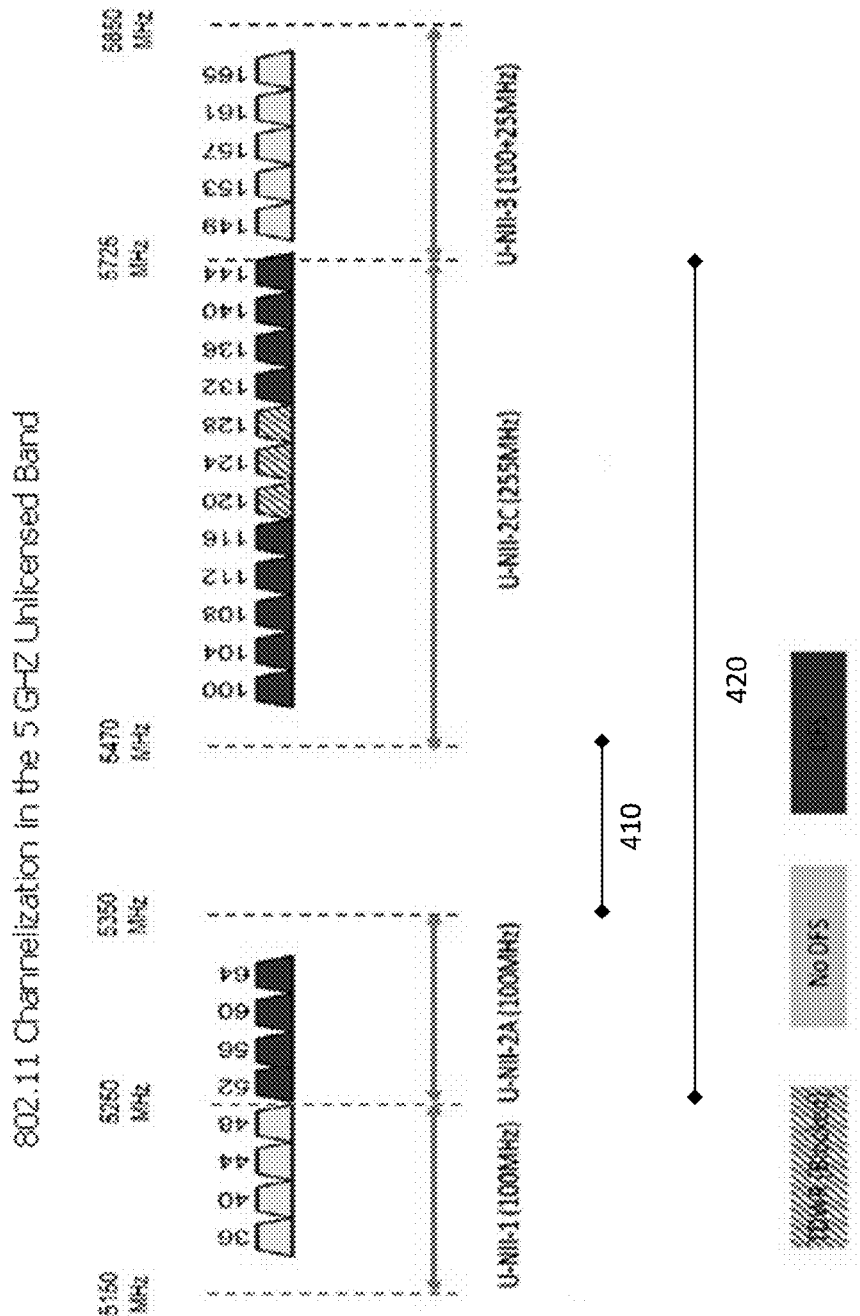
FIG. 4 is a diagram illustrating channelization of a UNII section of the 5 GHz unlicensed band according to one or more example embodiments.

FIG. 4 is a diagram illustrating channelization of the UNII section 5 GHz unlicensed band with respect to communications following the IEEE 802.11 protocols. As is illustrated in FIG. 4, the UNII-1 band may include four 20 MHz-wide channels 36~48, the UNII-2A band may include four 20 MHz-wide channels 52~64, the UNII-2C band may include twelve 20 MHz-wide channels 100~144, and the UNII-3 band may include five 20 MHz-wide channels 149~165. Further, channels within a particular band may be separated from band boundaries by guard bands which may be, for example, 5-20 MHz in width. Guard bands are illustrated in FIG. 4 by blank spaces in between the channels and the band boundaries, which are illustrated by vertical dashed lines.

As is illustrated in FIG. 4 channels 52-64 of the UNII-2A band and channels 100-116 and 132-144 of the UNII-2C band may have dynamic frequency selection (DFS) requirements. For example, in the US, the FCC defines frequencies or channels which cannot be used without DFS support. Devices that operate in frequencies having DFS requirements must be able to dynamically change the frequencies the devices are using for communication so as to avoid interference with, for example, government instruments including, for example, weather radar. For example, in the US, devices that operate using frequencies that have DFS requirements may need to be certified by the FCC in order to use the frequencies that have the DFS requirements. Further, in the US, channels 120-128 of the UNII-2C band are reserved for terminal Doppler weather radar (TDWR) systems.

As is illustrated in FIG. 4, in the US, channels 36-48 of the UNII-1 band and channels 149-165 of the UNII-3 band have no DFS requirements.

Coexistence of LTE and WIFI in the Unlicensed Band

As is discussed above, it is desirable to provide LTE-U in a manner that is fair to WIFI so that both the technologies may co-exist in the same unlicensed spectrum and a device that is capable of supporting both LTE-U, and WIFI may be able to concurrently access both air interfaces for communication with LTE-U eNodeB, and WIFI AP. The small cell eNBs 130A, 130B, 130C may use a channel selection algorithm to choose one or more of the unlicensed frequency band channels for LTE-U DL transmission. For example, some embodiments of the small cell eNBs 130A, 130B, 130C may select unlicensed channels based on measurements of energy received over one or more of the channels for a predetermined time interval (e.g., long-term energy detection), detection of preambles such as Wi-Fi preambles received over the channels, detection of overhead broadcast channels from neighboring nodes, and the like. The small cell eNBs 130A, 130B, and 130C may transmit DL signals over clear channels in the unlicensed frequency band. As used herein, the term "clear" is understood to indicate that a measured value of a parameter of signals in the unlicensed frequency band (such as a signal-to-noise ratio, received signal strength indicator, and the like) is below a threshold value indicating that the unlicensed frequency band is clear of transmissions by other nodes and packets transmitted over a channel of the unlicensed frequency band are unlikely to collide with packets transmitted by other nodes. This threshold value may be set according to a preference of an operator of the communications network 100. For example, if a small cell eNB (e.g., small cell eNB 130A) does not detect transmissions from the WIFI AP included in the small cell eNB or any nearby other operator or private WIFI APS, or transmissions from nearby other operator LTE-U eNodeB on a channel of the unlicensed frequency band, the small cell eNB may use the channel of the unlicensed frequency band for downlink transmissions. For example, referring to FIG. 1, each of the small cell eNBs 130A, 130B, 130C illustrated in communications network 100 may include an LTE-U channel selection module for selecting a channel when performing LTE-U communications with the UEs. Using first small cell eNB 130A as an example, the LTE-U channel selection module of the first small cell eNB 130A may employ long term energy detection, 802.11 preamble detection, LTE overhead channel detection and device assisted measurements to find one or more clean 20 MHZ channels in the 5 GHZ band for operation. In a case where the first LTE-U node 130A does not find a clear channel, then the first LTE-U node 130A has to share the channel with nearby WIFI or LTE-U deployments in a fair manner.

In countries such as in Europe that have listen before talk (LBT) requirements, a node (e.g., small cell eNB 130A) using LTE-U has to abide by these LBT requirements. In countries such as US that do not have the LBT requirement, a Small Cell node e.g. 130A may employ a carrier sensing adaptive transmission scheme with a 50% duty cycle (i.e. where the Small Cell eNB, e.g., 130A, transmits data using LTE-U for a period for 50% of the time, and then turns transmission OFF for 50% of the time, and where the periodicity is of the order of 100s of msec) so the small cell eNB is a fair neighbor to WIFI. Additionally, according to one or more example embodiments, a small cell eNB in communications network 100 using LTE-U may operate such that the small cell eNB does not use, for operations of the small cell eNB, a 20 MHZ channel that is currently serving as a primary WIFI channel containing a beacon channel that contains broadcast information for a UE device to get associated with a WIFI AP, which may include, for example, one of the WIFI APs included, respectively, in the first through third small cell eNBs 130A-C. For example, a 50% LTE-U transmission duty cycle that has even a periodicity of 50 msec may easily cause the UE devices to lose their association with the WIFI AP. Accordingly, a small cell eNB in communications network 100 performing LTE-U communications may perform LTE-U channel selection such that only channels which are not primary WIFI channels are selected for the LTE-U communications with the UEs.

Further, in order to increase channel usage and/or efficiency it is desirable for UEs in wireless communications network 100 to be able to use LTE-L, LTE-U and WIFI communications simultaneously. For example, in the wireless communications network 100, for UEs within a WIFI coverage area (e.g., WIFI coverage areas 140A-C), both LTE-U and LTE-L traffic can be offloaded to either WIFI operating in the 2.4 GHz band or WIFI operating in the 5 GHz band, thus increasing the ability of the wireless network 100 to manage network traffic.

However, even if a UE performs LTE-U communications in such a manner that interference with neighboring WIFI or LTE-U devices is reduced or avoided, a UE performing both LTE-U and WIFI communications may still produce disruptive interference for the communications of the UE, itself. As an example, the above-referenced disruptive interference may not occur in a scenario where a single UE uses WIFI (e.g., 802.11n) on the 2.4 GHz band while simultaneously using LTE-U on the 5 GHz unlicensed band. However, in a scenario where a single UE performs communications using both WIFI (e.g., 802.11n/ac) and LTE (i.e., LTE-U) over the same unlicensed band (e.g., the 5 GHz unlicensed band), it is desirable to employ suitable frequency isolation between the WIFI transmitter and the LTE receiver on the UE and the eNodeB for concurrent WIFI, and LTE-U operation. This frequency isolation prevents undesirable interference between WIFI transmission and LTE reception at the UE device thereby allowing satisfactory performance with respect to both protocols. For example, with typical WIFI transmit power of 18 dBm in a smartphone and an −30 dBm in-band blocking requirement for LTE, it is desirable to have an isolation of 48 dB between the WIFI transmitter and the LTE receiver in the UE in order to provide satisfactory simultaneous operation for both LTE-U and WIFI communications for the same UE.

According to one or more example embodiments, the above-referenced isolation between the WIFI transmitter and the LTE receiver of a device (e.g., a UE) within wireless communications network 100 may be provided in wireless communications network 100 by separating the 5 GHz unlicensed band into at least two frequency regions, and assigning WIFI communications and LTE-U communications to two different regions among the at least two frequency regions, respectively e.g. the upper (UNII 2C+UNII 3), and lower (UNII 1+UNII2a) parts of the 5 GHZ unlicensed spectrum. Here UNII2b provides the desired frequency isolation for concurrent LTE-U and WIFI operation on the same eNB, and UE device.

For example, the small cell eNBs within the wireless communications network 100 that support both WIFI and LTE-U communications (e.g., small cell eNBs 130A-C which each include WIFI APs) may be configured such that WIFI signals are received (or, alternatively, received and transmitted) by the small cell eNBs only on the portion of the unlicensed spectrum to which WIFI communications have been assigned, and LTE-U signals are transmitted (or, alternatively, received and transmitted) by the small cell eNBs only on the portion of the unlicensed spectrum to which LTE-U communications have been assigned. Similarly, UEs within the wireless communications network 100 that support both WIFI and LTE-U communications (e.g., UEs 142A-C, 152A-C, and 162A-C) may be configured such that WIFI signals are transmitted (or, alternatively, received and transmitted) by the UEs only on the portion of the unlicensed spectrum to which WIFI communications have been assigned, and LTE-U signals are received (or, alternatively, received and transmitted) by the UEs only on the portion of the unlicensed spectrum to which LTE-U communications have been assigned.

Alternatively, UEs and small cell eNBs of communications network 100 may be configured such that transmission and or reception of WIFI protocol communications is possible over the entire UNII section of the 5 GHz unlicensed band, while reception and transmission of LTE protocol communications by the UEs and small cell eNBs over the unlicensed spectrum signals are still limited to a portion of the UNII section of the 5 GHz band to which LTE-U communications have been assigned, as discussed above.

According to one or more example embodiments, the above-referenced configuration of eNBs and UEs within communications network 100 may be achieved, for example, though configuration of communications filters including, for example, Tx and receive (Rx) filters, included in the eNBs and UEs of the communications network 100. For example, instead of using LTE-U and WIFI Tx and Rx filters that cover the entire UNII section of the 5 GHz unlicensed band, the LTE-U Tx and/or Rx filters of eNBs and UEs within the communications network 100 may be configured to transmit and/or receive LTE-U signals only on the portion of the unlicensed spectrum to which LTE-U communications have been assigned, and the WIFI Tx and/or Rx filters of small cell eNBs and UEs within the communications network 100 may be capable of transmitting and/or receiving WIFI signals to or from the entire UNII band of the 5 GHZ unlicensed spectrum. However, via software configurations within the small cell eNBs of communications network 100, the WIFI APs in the small cell eNBs of the communication network 100 may be programmed not to use the portion or channels of the UNII section of the 5 GHz unlicensed band to which LTE-U communications have been assigned. Thus, in accordance with one or more example embodiments, because portions of the UNII section of the 5 GHz unlicensed band to which WIFI and LTE-U communications are respectively assigned are both smaller in width than the entire UNII section of the 5 GHz unlicensed band, sizes, complexities, and/or costs of the LTE-U Tx and Rx filters of the eNBs and UEs of the communications network 100 may be reduced in comparison to a scenario where the LTE-U Tx and Rx filters must be configured to handle the entire UNII section of the 5 GHz unlicensed band. Further, an undesirable ripple effect present in the LTE-U Tx and Rx filters of the eNBs and UEs of the communications network 100 may be reduced as well in comparison to a scenario where the LTE-U Tx and Rx filters must be configured to handle the entire UNII section of the 5 GHz unlicensed band. Manners, according to one or more example embodiments, in which the UNII section of the 5 GHz unlicensed band may be divided into different frequency regions corresponding, respectively, to LTE-U and WIFI communications will be discussed in greater detail below. Configuration of Tx and Rx filters included the eNBs and UEs of the communications network 100 as discussed above may be achieved, for example, in accordance with known methods for designing Tx and Rx band pass filters of eNBs and UEs to operate with respect to desired frequency bands.

According to one or more example embodiments, the 5 GHz unlicensed band or the UNII section of the 5 GHz band may be separated by a dividing frequency value. The dividing frequency value may be a particular frequency (e.g., 5400 MHz) or a frequency band.

According to one or more example embodiments, a first example division may be used where the UNII section of the 5 GHz unlicensed band is divided in accordance with a first dividing frequency value 410 illustrated in FIG. 4. The first dividing frequency value 410 may be the UNII-2B frequency band. According to the first example division, the at least two frequency regions into which the UNII section of the 5 GHz unlicensed band is divided include a first region between 5150 MHz and 5350 MHz (i.e., the UNII-1 and UNII-2A bands), and a second region between 5470 MHz and 5850 MHz (i.e., the UNII-2C and UNII-3 bands).

According to the first example division, LTE-U and WIFI communications may be assigned in accordance with an assignment where the eNBs and UEs of the communications network 100 are configured to perform WIFI communications for the UNII section of the 5 GHz unlicensed band only on the first region (i.e., the UNII-1 and UNII-2A bands), and configured to perform LTE-U communications for the UNII section of the 5 GHz unlicensed band only on the second region (i.e., the UNII-2C and UNII-3 bands). Accordingly, the band width and/or number of channels of the frequency region to which LTE-U communications are assigned (380 MHz width and fourteen useable 20 MHz-wide channels) may be larger than the band width and/or number of channels of the frequency region to which WIFI communications are assigned (200 MHz width and eight useable 20 MHz-wide channels). As a result, eNBs and UEs within the wireless network 100 may have more channels and/or frequencies to choose from when searching for a clear channel to use for LTE-U communications.

Alternatively, a different assignment may be used with the first example division in which the eNBs and UEs of the communications network 100 are configured to perform LTE-U communications for the UNII section of the 5 GHz unlicensed band only on the first region (i.e., the UNII-1 and UNII-2A bands), and configured to perform WIFI communications for the UNII section of the 5 GHz unlicensed band only on the second region (i.e., the UNII-2C and UNII-3 bands).

Further, according to one or more example embodiments, a second example division may be used where the UNII section of the 5 GHz unlicensed band is divided in accordance with a second dividing frequency value 420. The second dividing frequency value 420 may be the frequency band in between 5250 MHz and 5726 MHz. Thus, according to the second example division, the at least two frequency regions into which the UNII section of the 5 GHz unlicensed band is divided include a first region between 5150 MHz and 5250 MHz (i.e., the UNII-1 band), and a second region between 5725 MHz and 5850 MHz (i.e., the UNII-3 band).

According to the second example division, LTE-U and WIFI communications may be assigned in accordance with an assignment where the eNBs and UEs of the communications network 100 are configured to perform WIFI communications for the UNII section of the 5 GHz unlicensed band only on the first region (i.e., the UNII-1 band), and configured to perform LTE-U communications for the UNII section of the 5 GHz unlicensed band only on the second region (i.e., the UNII-3 band). Accordingly, the band width and/or number of channels in the frequency region to which LTE-U communications are assigned (125 MHz width and five useable 20 MHz-wide channels) may be larger than the band width and/or number of channels in the frequency region to which WIFI communications are assigned (100 MHz width and four useable 20 MHz-wide channels). As a result, eNBs and UEs within the wireless network 100 may have more channels and/or frequencies to choose from when searching for a clear channel to use for LTE-U communications.

Alternatively, a different assignment may be used with the second example division in which the eNBs and UEs of the communications network 100 are configured to perform LTE-U communications for the UNII section of the 5 GHz unlicensed band only on the first region (i.e., the UNII-1 band), and configured to perform WIFI communications for the UNII section of the 5 GHz unlicensed band only on the second region (i.e., the UNII-3 band).

Further, according to one or more example embodiments, a third example division may be used where the UNII section of the 5 GHz unlicensed band is divided in accordance with a third dividing frequency value that is a single frequency (e.g., 5400 MHz). According to one or more example embodiments, the third dividing frequency may be any frequency in the unlicensed spectrum. For example, the third dividing frequency value may be any frequency in between 5250 MHz and 5726 MHz within the 5 GHz unlicensed band. Thus, according to the third example division, the at least two frequency regions into which the UNII section of the 5 GHz unlicensed band is divided include a first region between 5150 MHz and the third dividing frequency value, and a second region between the third dividing frequency value and 5850 MHz.

By dividing the UNII section of the 5 GHz unlicensed band according to the manners discussed above in the communications network 100, LTE-U communications and the co-located WIFI communications of the same operator will not compete for the same 20 MHZ channels for their respective concurrent operations in communications network 100. The Small Cell 130A-C will only have to share, and compete, for same 20 MHZ-wide channels in the UNII section 5 GHZ unlicensed band with LTE-U Small cells and WIFI deployments of a second different operator. A UE device within the wireless communications network 110, such as the first WIFI UE 142A, that is served by the network operator of the wireless communications network 100 may not be able to detect the WIFI signals from a second network operator or a private WIFI AP if the UE device operates in the same frequency band used for LTE-U operation in communications network 100. However, the first WIFI UE 142A will be able to detect and connect to a WIFI AP of another network operator or a private WIFI AP using the same 20 MHZ channel, for example, if the LTE-U operation of communications network 100 is turned off.

FIGS. 3A, 3B and 4 illustrate the UNII section of the 5 GHz unlicensed band used in the US and defined by the FCC as an example of a manner in which an unlicensed portion of the radio spectrum may be designated and organized. However, other countries, regions, and/or government organizations may designate different portions of the radio spectrum as requiring or not requiring a license for use. Further, other countries, regions and/or government organizations may organize the portions of the radio spectrum designated as requiring a license for use in a manner different than that shown in FIGS. 3A, 3B and 4. Thus, one or more example embodiments, the manners of dividing the 5 GHz unlicensed band described herein may be applied to any unlicensed portion of the radio spectrum as defined by any country, region, and/or government organization.

Methods of operating communications network 100 to provide LTE and WIFI coexistence on the same unlicensed band within the same cell according to one or more example embodiments will now be discussed below with referent to FIGS. 5 and 6.

Example Methods for Providing Coexistence of LTE and WIFI in the Unlicensed Band on the Same Cell FIG. 5 is a flow chart illustrating an example method of operating an eNB in a wireless communications network to perform LTE and WIFI communications on an unlicensed portion of a radio spectrum, where the unlicensed portion has been divided into first and second frequency regions.

FIG. 5 will be explained from the perspective of the first small cell eNB 130A of the wireless network 100. FIG. 5 will be explained with reference to a scenario where the first small cell eNB 130A is communicating with the first WIFI UE 142A using both the WIFI and LTE protocols over the unlicensed portion of the radio spectrum, the unlicensed portion of the radio spectrum is the UNII section of the 5 GHZ unlicensed band defined by the FCC, the UNII section of the 5 GHz unlicensed band has been divided by the first frequency dividing value 410 in accordance with the first example division described above with reference to FIG. 4, WIFI communications are assigned to the first region (i.e., the UNII-1 and UNII-2A bands), and LTE-U communications are assigned to the second region (i.e., the UNII-2C and UNII-3 bands).

Referring to FIG. 5, in step S510, the eNB performs a first frequency selection operation by selecting one or more first frequencies from the first frequency region. The first frequency selection operation in step S510 may be, for example, an operation for selecting one or more frequencies for WIFI communications. For example, in step S510, the first small cell eNB 130A may select one or more frequencies (or channels) from one or both of the UNII-1 and UNII-2A bands. Further, the first small cell eNB 130A may exclude all frequencies or channels not included in the first frequency region from the first frequency selection operation in step S510. The selection of the one or more first frequencies (or channels) may be performed in accordance with known methods of selecting WIFI channels.

Further, in step S510, the first small cell eNB 130A may communicate the selected one or more first frequencies (or channels) to the first WIFI UE 142A.

In step S520, the eNB performs a second frequency selection operation by selecting one or more second frequencies from the second frequency region. The second frequency selection operation in step S520 may be, for example, an operation for selecting one or more frequencies for LTE communications. For example, in step S520, the first small cell eNB 130A may select one or more frequencies (or channels) from one or both of the UNII-2C and UNII-3 bands. Further, the first small cell eNB 130A may exclude, from being selected in the second frequency selection operation in step S520, all frequencies or channels not included in the second frequency region.

Further, in step S520, the first small cell eNB 130A may communicate the selected one or more second frequencies (or channels) to the first WIFI UE 142A.

Further, as is discussed above, for performing channel selection for LTE-U communications, the first small cell eNB 130A may use a channel selection algorithm to choose one or more of the unlicensed frequency band channels for LTE-U DL transmission. For example, the first small cell eNB 130A may select unlicensed channels based on measurements of energy received at the first small cell eNB 130A over one or more of the channels for a predetermined time interval (e.g., long-term energy detection), detection of preambles such as Wi-Fi preambles received over the channels, detection of overhead broadcast channels from neighboring nodes, and the like. The first small cell eNBs 130A may transmit DL signals over clear channels in the unlicensed frequency band detected by the small cell eNB 130A.

In step S530, the eNB performs data communication with a UE using the unlicensed portion of the radio spectrum. According to one or more example embodiments, the data communication includes performing both WIFI protocol communications using the one or more first frequencies (or channels) and LTE protocol communications using the one or more second frequencies (or channels), where the WIFI protocol communications and the LTE protocol communications are performed simultaneously. For example, in step S530, the first small cell eNB 130A may transmit data to and/or receive data from the first WIFI UE 142A using both WIFI protocol communications over the one or more first frequencies selected in step S510 and LTE protocol communications over the one or more second frequencies selected in step S520, simultaneously. For example, the WIFI protocol communications performed in step S530 may be performed using the WIFI Tx and Rx filters that are configured for performing WIFI communications over the UNII section of the 5 GHz unlicensed band and are included the first small cell eNB 130A, and the LTE protocol communications performed in step S530 may be performed using the LTE-U Tx and Rx filters that are configured for performing LTE communications over the UNII section of the 5 GHz unlicensed band and are included the first small cell eNB 130A.

Accordingly, in step S530, the first small cell eNB 130A may transmit data to and/or receive data from the first WIFI UE 142A using both the WIFI and LTE protocols simultaneously such that only frequencies within the first frequency region are used to perform the WIFI protocol communications, and only frequencies within the second frequency region are used to perform the LTE protocol communications.

Further, according to one or more example embodiments, the first small cell eNB 130A may operate in the SDL mode in which no LTE protocol uplink communications over the unlicensed spectrum take place between a UE and the small cell eNB 130A.

FIG. 6 illustrates an example method of operating a UE in a wireless communications network to perform LTE and WIFI communications on an unlicensed portion of a radio spectrum, where the unlicensed portion has been divided into first and second frequency regions.

FIG. 6 will be explained from the perspective of the first WIFI UE 142A of the wireless network 100. FIG. 6 will be explained with reference to a scenario where the first WIFI UE 142A is communicating with the first small cell eNB 130A using both the WIFI and LTE protocols over the unlicensed portion of the radio spectrum, the unlicensed portion of the radio spectrum is the UNII section of the 5 GHZ unlicensed band defined by the FCC, the UNII section of the 5 GHz unlicensed band has been divided by the first frequency dividing value 410 in accordance with the first example division described above with reference to FIG. 4, WIFI communications are assigned to the first region (i.e., the UNII-1 and UNII-2A bands), and LTE-U communications are assigned to the second region (i.e., the UNII-2C and UNII-3 bands).

Referring to FIG. 6, in step S610, the UE receives, from an eNB, an indication of one or more first frequencies of a first frequency region selected by the eNB.

For example, in step S610 the first WIFI UE 142A may receive, from the first small cell eNB 130A, an indication of one or more first channels chosen by the first small cell eNB 130A for use in performing WIFI protocol communications over the UNII section of the 5 GHz unlicensed band. For example, in step S610, the one or more frequencies (or channels) received at the first WIFI UE 142A may be included in one or both of the UNII-1 and UNII-2A bands. According to one or more example embodiments, the one or more first channels received in step S610 may be channels included in the first frequency region, and may exclude channels included in the second frequency region.

In step S620, the UE receives, from an eNB, an indication of one or more second frequencies of a second frequency region selected by the eNB.

For example, in step S620 the first WIFI UE 142A may receive, from the first small cell eNB 130A, an indication of one or more second channels chosen by the first small cell eNB 130A for use in performing LTE protocol communications over the UNII section of the 5 GHz unlicensed band. For example, in step S620, the one or more frequencies (or channels) received at the first WIFI UE 142A may be included in one or both of the UNII-2C and UNII-3 bands. According to one or more example embodiments, the one or more second channels received in step S620 may be channels included in a second frequency region, and may exclude channels included in the first frequency region.

In step S630, the UE performs data communication with an eNB using the unlicensed portion of the radio spectrum. According to one or more example embodiments, the data communication includes performing both WIFI protocol communications using the one or more first frequencies (or channels) and LTE protocol communications using the one or more second frequencies (or channels), where the WIFI protocol communications and the LTE protocol communications are performed simultaneously. For example, in step S630, the first WIFI UE 142A may transmit data to and/or receive data from the first small cell eNB 130A using both WIFI protocol communications over the one or more first frequencies (or channels) selected in step S610 and LTE protocol communications over the one or more second frequencies (or channels) selected in step S620, simultaneously. For example, the WIFI protocol communications performed in step S630 may be performed using the WIFI Tx and Rx filters that are configured for performing WIFI communications over the 5 GHz unlicensed band and are included the first WIFI UE 142A, and the LTE protocol communications performed in step S630 may be performed using the LTE-U Tx and Rx filters that are configured for performing LTE communications over the 5 GHz unlicensed band and are included the first WIFI UE 142A.

Accordingly, in step S630, the first WIFI UE 142A may transmit data to and/or receive data from the first small cell eNB 130A using both the WIFI and LTE protocols simultaneously such that only frequencies within the first frequency region are used to perform the WIFI protocol communications, and only frequencies within the second frequency region are used to perform the LTE protocol communications.

Further, according to one or more example embodiments, the first WIFI UE 142A may operate in the SDL mode in which no LTE protocol uplink communications over the unlicensed spectrum take place between the first WIFI UE 142A and an eNB.

FIGS. 5 and 6 are described using the first small cell eNB 130A and the first WIFI UE 142A as examples However, according to one or more example embodiments, any functions described above with reference to FIG. 5 or FIG. 6 for the first small cell eNB 130A may be performed by any small cell eNB in the wireless communications network 100, and any functions described above with reference to FIG. 5 and FIG. 6 for the first WIFI UE 142A may be performed by any UE in the wireless communications network 100 including, for example, any UE within one of the first through third WIFI coverage areas (140A-C).

Further, FIGS. 5 and 6 are described above with reference to an example where the unlicensed portion of the radio spectrum is the UNII section of the 5 GHz unlicensed band defined by the FCC. However, according to example embodiments, the example methods described above with reference to FIGS. 5 and 6 for the scenario where the unlicensed portion of the radio spectrum is the UNII section of the 5 GHz unlicensed band defined by the FCC may be performed for any scenario in which any portion of the radio spectrum is designated as the unlicensed portion of the radio spectrum.

Further, though first frequency dividing value 410 is used in the description of FIGS. 5 and 6 as an example frequency dividing value, any frequency dividing value may be used in the methods described above with reference to FIGS. 5 and 6 including, for example, the second frequency dividing value 420, the third frequency dividing value described above with reference to FIG. 4, or any other frequency or frequency range within the unlicensed portion of the radio spectrum.

LTE Channel Selection

As is discussed above with reference to FIGS. 5 and 6, in steps S520 and S620, one or more channels are chosen by an eNB, respectively, for LTE communications. In general, channel selection for the LTE protocol provides a substantial amount of flexibility with respect to the manner in which channels may be defined for a particular frequency band. On the other hand, channel selection for the 802.11 protocol in the 5 GHz unlicensed band may be limited, for example, to the channels illustrated in FIG. 4. Thus, according to example embodiments, in order to simplify the process of providing harmony between LTE-U communications and WIFI communications performed in the same area or cell, the eNBs and/or UEs in the wireless network 100 may be configured such that, in steps S520 and S620, the channelization used for the selection of one or more frequencies or channels to use for LTE-U communications matches the channelization used in steps S510 and S610 for the selection of one or more frequencies or channels to use for WIFI communications over the 5 GHz unlicensed band. According to one or more example embodiments, the channelization illustrated in FIG. 4 is an example of the channelization used in steps S510 and S610 for the selection of one or more frequencies or channels to use for WIFI communications over the 5 GHz unlicensed band. An example for achieving the LTE-U channelization discussed above with reference to steps S520 and S620 will be illustrated below with reference to formula (1) and table 1.

For example, using an LTE channel raster of 100 khz, a DL frequency for LTE communications over the 5 GHz unlicensed band may be determined in accordance with formula (1) below $$F_{DL} = F_{LOW} + 0.1(\text{EARFCN} - \text{EARFCN}_{OFFSET}), \quad (1)$$

where $F_{DL}$ is a center DL frequency, $F_{LOW}$ is a lowest allowed center frequency for DL, EARFCN is a carrier number, or evolved absolute radio frequency channel number, which represents a center frequency of an LTE carrier, and EARFCN OFFSET is a lowest defined EARFCN for a particular band. According to one or more example embodiments, table 1 below illustrates how the $F_{LOW}$, EARFCN, and $\text{EARFCN}_{OFFSET}$ values may be set for each of the UNII-1, UNII-2, and UNII-3 bands of the 5 GHz unlicensed band.

TABLE 1

| 5 GHZ Band | $F_{Low}$ (MHz) | EARFCN$_{OFFSET}$ | EARFCN |
|---|---|---|---|
| UNII-1 | 5150 | 58000 | 58000-58999 |
| UNII-2 | 5250 | 59000 | 59000-63749 |
| UNII-3 | 5725 | 63750 | 63750-6499 |

Even though a large number of LTE $F_{DL}$ values are possible, only those EARFCN values for each 5 GHZ band will be used out of the entire specified range that will define a LTE-U channel to match the 802.11 channelization structure. Since LTE-U and WIFI communications in a same cell have to share the 20 MHZ-wide channels in the UNII bands of the 5 GHZ unlicensed spectrum, ensuring that the LTE-U and WIFI communications channel structures match substantially or, alternatively, exactly as shown in FIG. 4 will ensure optimal channel sharing performance. As an alternative to matching channel structures, overlapping channel structures between the two technologies (i.e., LTE-U and WIFI) may likely result in interference to two other channels of the one technology (e.g., WIFI) as a result of one channel activity in the other technology (e.g. LTE-U).

Thus, the example methods, eNBs above may facilitate the use of both WIFI and LTE communications over the same unlicensed portion of the radio spectrum (e.g., the 5 GHz band) for the same cell, thus allowing the deployment of small cells that support LTE-L, LTE-U, and WIFI communications, between a small cell eNB and a UE, simultaneously in the same cell.

Example embodiments being thus described, it will be obvious that embodiments may be varied in many ways. Such variations are not to be regarded as a departure from example embodiments, and all such modifications are intended to be included within the scope of example embodiments.

What is claimed:

1. A method of operating a first network element in a wireless communications network to perform WIFI and LTE communications with a second network element on an unlicensed portion of a radio spectrum, the method comprising:

selecting, at the first network element, a first communication frequency for WIFI protocol communications and a second communication frequency for long term evolution (LTE) protocol communications, the unlicensed portion of the radio spectrum being divided into a first frequency region for WIFI protocol communications and a second frequency region for LTE protocol communications by a frequency dividing value, the frequency dividing value being one of a frequency and a frequency range, the first communication frequency being selected from a plurality of communication frequencies in the first frequency region, the second communication frequency being selected from a plurality of communication frequencies in the second frequency region, the second frequency region being within a transmission and/or reception frequency range of LTE-U transmit and receive filters of the first network element, the LTE-U transmit and receive filters being configured to have a transmission and/or reception range that does not include all of the unlicensed portion of the radio spectrum; and performing, at the first network element, data communications with the second network element using the first communication frequency and the second communication frequency in the unlicensed portion of the radio spectrum, the performing the data communications including, performing, at the first network element, WIFI protocol communications over the unlicensed portion of the radio spectrum, the WIFI protocol communications including at least one of transmission to the second network element, and reception from the second network element, of WIFI protocol data, the WIFI protocol communications being performed using the first communication frequency and performing, at the first network element, LTE protocol communications over the unlicensed portion of the radio spectrum, the LTE protocol communications including at least one of transmission to the second network element, and reception from the second network element, of LTE protocol data, the LTE protocol communications being performed using the second communication frequency, the WIFI protocol communications and the LTE protocol communications being performed by the first network element simultaneously.

2. The method of claim 1, wherein the first network element includes an evolved node B (eNB) and a WIFI access point (AP), and the second network element is a user equipment (UE).

3. The method of claim 1, wherein the first network element is a user equipment (UE), and the second network element includes an evolved node B (eNB) and a WIFI access point (AP).

4. The method of claim 1, wherein the unlicensed portion of the radio spectrum is a unlicensed national information infrastructure (UNII) section of a 5 GHz unlicensed band.

5. The method of claim 4, wherein the frequency dividing value is a frequency range that includes a UNII-2 band.

6. A first network element for performing LTE and WIFI communications in a wireless communications network with a second network element on an unlicensed portion of a radio spectrum, the first network element comprising:

a processing unit including one or more processors, the processing unit being configured to control operations including, selecting, at the first network element, a first communication frequency for WIFI protocol communications and a second communication frequency for long term evolution (LTE) protocol communications, the unlicensed portion of the radio spectrum being divided into a first frequency region for WIFI protocol communications and a second frequency region for LTE protocol communications by a frequency dividing value, the frequency dividing value being one of a frequency and a frequency range, the first network frequency being selected from a plurality of communication frequencies in the first frequency region, the second communication frequency being selected from a plurality of communication frequencies in the second frequency region, the second frequency region being within a transmission and/or reception frequency range of LTE-U transmit and receive filters of the first network element, the LTE-U transmit and receive filters being configured to have a transmission and/or reception range that does not include all of the unlicensed portion of the radio spectrum, and performing, at the first network element, data communications with the second network element using the first communication frequency and the second communication frequency in the unlicensed portion of the radio spectrum, the performing the data communications including, performing, at the first network element, WIFI protocol communications over the unlicensed portion of the radio spectrum, the WIFI protocol communications including at least one of transmission to the second network element, or reception from the second network element, of WIFI protocol data, the WIFI protocol communications being performed using the first communication frequency, and performing, at the first network element, long term evolution (LTE) protocol communications over the unlicensed portion of the radio spectrum, the LTE protocol communications including at least one of transmission to the second network element, or reception from the second network element, of LTE protocol data, the LTE protocol communications being performed using the second communication frequency, the WIFI protocol communications and LTE protocol communications being performed by the first network element simultaneously.

7. The first network element of claim 6, wherein the first network element includes an evolved node B (eNB) and a WIFI access point (AP), and the second network element is a user equipment (UE).

8. The first network element of claim 6, wherein the first network element is a user equipment (UE), and the second network element includes an evolved node B (eNB) and a WIFI access point (AP).

9. The first network element of claim 6, wherein the processing unit is configured such that the unlicensed portion of the radio spectrum is a unlicensed national information infrastructure (UNII) section of a 5 GHz unlicensed band.

10. The first network element of claim 9, wherein the processing unit is configured such that the frequency dividing value is a frequency range that includes an infrastructure UNII-2 band.

* * * * *